United States Patent
Malet

(10) Patent No.: US 10,759,939 B2
(45) Date of Patent: Sep. 1, 2020

(54) IMPACT MODIFIED TRANSPARENT POLYAMIDE POLYMER COMPOSITION

(71) Applicant: Arkema France, Colombes (FR)

(72) Inventor: Frederic Malet, Lyons (FR)

(73) Assignee: Arkema France, Colombes (FR)

( * ) Notice: Subject to any disclaimer, the term of this patent is extended or adjusted under 35 U.S.C. 154(b) by 11 days.

(21) Appl. No.: 15/523,448

(22) PCT Filed: Nov. 4, 2015

(86) PCT No.: PCT/EP2015/075733
§ 371 (c)(1),
(2) Date: May 1, 2017

(87) PCT Pub. No.: WO2016/071409
PCT Pub. Date: May 12, 2016

(65) Prior Publication Data
US 2017/0306149 A1    Oct. 26, 2017

(30) Foreign Application Priority Data

Nov. 4, 2014  (FR) ..................................... 14 60652

(51) Int. Cl.
*C08L 77/06* (2006.01)
*C08L 51/04* (2006.01)

(52) U.S. Cl.
CPC ............... *C08L 77/06* (2013.01); *C08L 51/04* (2013.01)

(58) Field of Classification Search
CPC ........................ C08L 2207/53; C08L 51/00–10
See application file for complete search history.

(56) References Cited

U.S. PATENT DOCUMENTS

| | | |
|---|---|---|
| 5,696,202 A | 12/1997 | Torre |
| 5,773,558 A | 6/1998 | Torre |
| 5,886,087 A | 3/1999 | Torre |
| 6,008,288 A | 12/1999 | Torre |
| 6,100,370 A * | 8/2000 | Hoff ...................... C08G 69/02 528/125 |
| 6,277,911 B1 | 8/2001 | Torre |
| 6,869,497 B2 * | 3/2005 | Doe .......................... C09J 4/00 156/326 |
| 2007/0249789 A1 | 10/2007 | Buehler et al. |
| 2009/0247699 A1 | 10/2009 | Buehler et al. |
| 2014/0275392 A1 | 9/2014 | Buhler |

FOREIGN PATENT DOCUMENTS

EP   0212510 A2    3/1987
EP   0955326 A1 *  11/1999

OTHER PUBLICATIONS

L. Ren et al, "The Influence of the arrangement of styrne in methyl methacrylate/butadience/styrene on the properties of PMMA/SAN/MBS blends" Research Article—Polymers Advanced Technologies, vol. 25, No. 3, Nov. 22, 2013. (Nov. 22, 2013) pp. 273-278.

* cited by examiner

*Primary Examiner* — Ana L. Woodward
(74) *Attorney, Agent, or Firm* — Lynn B. Morreale

(57) ABSTRACT

The present invention relates to an impact modified polyamide composition. In particular, the present invention relates to impact modified transparent polyamide compositions comprising a multistage polymer. More particularly, the present invention relates to the use of multistage polymer as impact modifier in a transparent polyamide composition.

31 Claims, No Drawings

IMPACT MODIFIED TRANSPARENT POLYAMIDE POLYMER COMPOSITION

CROSS-REFERENCE TO RELATED APPLICATIONS

This application is a national stage application under 35 U.S.C. § 371 of PCT/EP2015/075733, filed Nov. 4, 2015 which claims benefit to application FR14.60652, filed Nov. 4, 2014.

FIELD OF THE INVENTION

The present invention relates to an impact modified polyamide composition.

In particular the present invention it relates to impact modified transparent polyamide composition comprising a multistage polymer.

More particularly the present invention relates to the use of multistage polymer as impact modifier in a transparent polyamide composition.

Technical Problem

Among high-performances polymers, transparent polyamides are particularly advantageous as they exhibit numerous mechanical properties, such as impact strength, tensile strength and/or compressive strength, high resistance to external attack (such as heat, chemicals, UV radiation, and the like), as well as transparency. The arrival has consequently been seen of objects based on polyamides, such as, for example, spectacle frames, various housings, motor vehicle accessories, surgical materials, packaging or sporting goods.

In the field of transparent polyamides with high light-permeability, two types of polymer are known, amorphous ones which have only a glass transition temperature and microcrystalline ones which have a glass transition temperature and a melting point.

Amorphous polyamides and microcrystalline polyamides have an improved transparency but have usually a notched impact strength according to Charpy that does not go beyond the range of 14 kJ/m2 to 18 kJ/m2 at 23° C.

One objective of the present invention is to propose transparent polyamide polymer composition with increased impact resistance.

Another objective of the present invention is to propose a transparent polyamide polymer composition with increased impact resistance, while keeping still acceptable the optical properties of said composition. Optical properties relates in particular to minimising the opacity (haze) and maximising the light transmission of moulded articles produced from the impact modified polyamide composition by moulding.

Another objective of the present invention is also to provide a transparent polyamide polymer composition with increased impact resistance, while keeping still acceptable the other mechanical properties. Other mechanical property relates in particular to avoid an important decrease in the modulus while improving the impact resistance of a moulded articles produced from the impact modified transparent polyamide composition.

BACKGROUND OF THE INVENTION

Prior Art

The document EP 0725101 discloses transparent colourless amorphous polyamide and moulded articles. The notched impact resistance at 23° C. is only 12 kJ/m2. The composition comprises no impact modifier.

The document EP 1369447 discloses transparent polyamide moulding materials having improved transparency, resistance to chemicals and high permanent fatigue strength. The moulding can comprises an impact modifier such as terpolymers made of ethylene glycidyl methacrylate or maleic anhydride grafted polyethylene or propylene.

The document EP 1847569 discloses a transparent polyamide molding compositon. The molding composition comprises at least one transparent homopolyamide and/or copolyamide and a polyesteramide for increasing impact strength. As one of the comparative examples a core-shell impact modifier is used.

The document US2009/0247699 discloses polyamide moulding compounds for varnish free, tough casings with high gloss surface. The moulding compound contains two amorphous copolyamides and at least one impact modifier. A preferred impact modifier is a core-shell impact modifier based on metacrylates, butadiene and styrene (MBS copolymer).

The document US2014/275392 discloses a polyamide moulding compound and moulded articles produced there from. The polyamides moulding compound comprises a functionalized blockcopolymer as impact modifier. Core-shell polymers are used between others polymeric materials as impact modifiers in the comparative examples only.

BRIEF DESCRIPTION OF THE INVENTION

Surprisingly it has been found that a polymer composition comprising
  a) a transparent polyamide PA and
  b) a multistage polymer characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10, is having an impact strength increase while having a light transmission of at least 75% (for a sheet of 2 mm thickness).

Surprisingly it has also been found that a polymer composition comprising
  a) a transparent polyamide PA and
  b) a multistage polymer
characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10, is having an impact strength increase while still having a haze below 30% (for a sheet of 2 mm thickness).

Surprisingly it has additionally been found that a polymer composition comprising
  a) a transparent polyamide PA and
  b) a multistage polymer
characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10, is having an impact strength increase while still having a haze below 30% and a light transmission of at least 75% (for a sheet of 2 mm thickness).

Surprisingly it has also been found that a method for manufacturing a polymer composition comprising the step of blending a transparent polyamide PA and a multistage polymer characterized that the composition fulfils the following formula $$|k-l| \leq t$$

wherein k represents the ratio in mol % of aromatic groups in the polyamide PA, l represents the ratio in mol % of aromatic groups in the multistage polymer and the parameter t is at most 10, yields to a polymer composition having an impact strength increase while having a light transmission of at least 75% and still having a haze below 25% (for a sheet of 2 mm thickness) in comparison to the same composition with out multistage polymer.

DETAILED DESCRIPTION OF THE INVENTION

According to a first aspect, the present invention relates to a polyamide polymer composition comprising
 a) a transparent polyamide and
 b) a multistage polymer
characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10.

According to a second aspect, the present invention relates to a polyamide polymer composition comprising
 a) a transparent polyamide having a melting enthalpy ΔH of at most 7 J/g and
 b) a multistage polymer
characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10.

In a third aspect the present invention relates to a method for manufacturing a polymer composition comprising the step of blending a transparent polyamide PA and a multistage polymer characterized that the composition fulfils the following formula $$|k-l| \leq t$$

wherein k represents the ratio in mol % of aromatic groups in the polyamide PA, l represents the ratio in mol % of aromatic groups in the multistage polymer and the parameter t is at most 10.

By the term "transparent" as used is understood a light transmission of at least 75% measured on a plate of 2 mm thickness at 560 nm (ISO 13468-1/1996).

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth) acrylic" as used is denoted all kind of acrylic and methacrylic monomers.

By the term "(meth)acrylic polymer" as used is denoted that the (meth)acrylic polymer comprises essentially polymers comprising (meth)acrylic monomers that make up 50 wt % or more of the (meth)acrylic polymer.

With regard to the polyamide of the composition of the present invention, it is an amorphous or microcrystalline polyamide.

Polyamides are termed as amorphous, if they show in dynamic differential calorimetry (differential scanning calorimetry, DSC) according to ISO 11357-3/2011 at a heating rate of 20 K/min, a melting enthalpy ΔH of at most 7 J/g, preferably 3 J/g and more preferably at most 1 J/g.

Polyamides are termed as microcrystalline, if they show in dynamic differential calorimetry (differential scanning calorimetry, DSC) a glass transition temperature Tg and a melting point with a melting enthalpy ΔH of at least 7 J/g and if they are transparent.

The polyamide of the composition according to the invention has a glass transition temperature Tg of at least 100° C. The Tg is measured with dynamic differential calorimetry (differential scanning calorimetry, DSC) to according to ISO 11357-2/2013. The glass transition temperature Tg of the polyamide measured according ISO 11357-2/2013 is preferably from 108° C. to 192° C. and more preferably from 118° C. to 172° C.

The polyamide of the composition according to the invention is transparent. By transparent is meant that the light transmission of a sheet of 2 mm thickness is least 75% measured at 560 nm (ISO 13468-1/1996), more preferably at least 80%, advantageously at least 85% and particularly preferred at least 90%.

The polyamide (PA) of the composition of the present invention is chosen from a homopolyamide or a copolyamide.

The homopolyamide of the composition of the present invention is not made from a lactam or an aminocarboxylic acid. The homopolyamide of the present invention is made from a diamine and a dicarboxylic acid. The general formula (1) of this homopolyamide is

PA XX.YY  (1)

wherein XX represents a diamine and YY represent a dicarboxylic acid also simply called diacid.

Diamines XX are aliphatic diamines linear or not, or cycloaliphatic diamines, or diamines with partially aromatic structures. Preferably the diamine is aliphatic branched or cycloaliphatic.

The XX diamine can be a cycloaliphatic diamine. Among cycloaliphatic diamines, those comprising two rings are preferred. They correspond in particular to the following general formula:

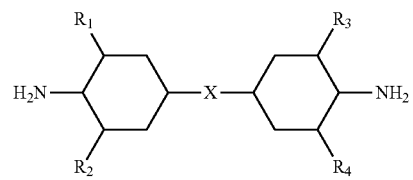

in which:

R1 to R4 represent identical or different groups chosen from a hydrogen atom or alkyl groups of 1 to 6 carbon atoms and X represents either a single bond or a divalent group composed:
- of a linear or branched aliphatic chain comprising from 1 to 10 carbon atoms,
- of a cycloaliphatic group of 6 to 12 carbon atoms,
- of a linear or branched aliphatic chain of 1 to 10 carbon atoms substituted by cycloaliphatic groups of 6 to 8 carbon atoms or
- of a group of 8 to 12 carbon atoms composed of a linear or branched dialkyl with a cyclohexyl or benzyl group.

More preferably, the cycloaliphatic diamine of the polyamide according to the invention is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi(cyclohexylamine) (PACP).

A non-exhaustive list of cycloaliphatic diamines can be found in the article "Cycloaliphatic Amines" (Encyclopaedia of Chemical Technology, Kirk-Othmer, 4th Edition (1992), pp. 386-405).

More preferably still, and with a view to obtaining a transparent copolyamide, the cycloaliphatic diamine is chosen from bis(3-methyl-4-aminocyclohexyl)methane (BMACM or MACM) p-bis(aminocyclohexyl)methane (PACM) and isopropylidenedi(cyclohexylamine) (PACP).

The XX diamine can have a partially aromatic structure. Mention may be made, among arylaromatic diamines, of 1,3-xylylenediamine (also known as meta-xylylenediamine or MXDA), 1,4-xylylenediamine (also known as para-xylylenediamine or PXDA) and their mixtures.

The XX diamine of formula (1) can be aliphatic and linear, and has the general formula $H_2N-(CH_2)_a-NH_2$. Preferably, the XX diamine is chosen among butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22), and diamines obtained from dimmer fatty diacids.

The XX diamine of formula (1) can be aliphatic and branched. Preferably, the XX diamine is chosen among 2-methyl-1,5-pentamethylenediamine, trimethyl-1,6-hexanediamine, 5-methylnonamethylenediamine, and their isomers or mixtures thereof.

Diacids YY of formula (1) are aliphatic dicarboxylic acids, or aromatic dicarboxylic acids, or cycloaliphatic acids.

The YY dicarboxylic acid could be aliphatic and linear, and has the general formula $HOOC-(CH_2)_b-COOH$. Preferably, it has from 4 to 36 carbon atoms. More preferably, it can be chosen among sebacic acid (b=8, 10 carbon atoms), dodecanedioic acid (b=10, 12 carbon atoms), tetradecanedioic acid (b=12, 14 carbon atoms), octadecanedioic acid (b=16, 18 carbon atoms), and dimer fatty diacids with b=34 (36 carbon atoms).

The dimer fatty acids mentioned above are dimerized fatty acids obtained by oligomerization or polymerization of unsaturated monobasic fatty acids comprising a long hydrocarbon chain (such as linoleic acid and oleic acid), as described in particular in the document EP 0 471 566.

The YY dicarboxylic acid could be aromatic. Preferably, it is chosen among terephthalic acid, isophthalic acid, substituted aromatic dicarboxylic acid, for example 2,6-naphtalene dicarboxylic acid and 5-t-butylisophthalic acid.

The YY dicarboxylic acid could be cycloaliphatic, with at least one cyclohexane ring. Preferably, this cycloaliphatic diacid is 1,4-cyclohexanedicarboxylic acid, or 1,2-cyclohexanedicarboxylic acid.

The molar proportions of XX diamine and of YY diacid of the formula (1) are preferably stoichiometric.

Among the combinations which can be envisaged for a homopolyamide according to formula (1), symbolizing bis (3-methyl-4-aminocyclohexyl)methane (BMACM) by the letter B, p-bis(aminocyclohexyl)methane (PACM) by the letter P, 2-methyl-1,5-pentamethylenediamine by the letters MPMD, trimethyl-1,6-hexanediamine by the letters TMD as diamins XX; and isophthalic acid by the letter I as diacid or the diacid YY with general formula $HOOC-(CH_2)_y-COOH$ comprising y methylene groups by the number y+2 for the carbon atoms of the diacid, the following homopolyamides are of particularly pronounced interest: TMD.T, TMD.I, TMD.18, TMD.14, TMD.12, TMD.10, MPMD.T, MPMD.I, MPMD.18, MPMD.14, MPMD.12, MPDM.10, B.10, B.11, B.12, B.13, B.14, B.16, B.18, B.19, B.20, B.21, B.I, P.10, P.11, P.12, P.13, P.14, P.16, P.18, P.19, P.20, P.I, and P.21. Preferably the homopolyamide is chosen from TMD.T, TMD.I, MPMD.T, MPMD.I, B.12, B.14, B.18, P.12, P.14, and P.18, and more preferably from TMD.T, TMD.I, MPMD.T, MPMD.I, B.12, B.14, P.12, and P.14.

The copolyamide also called copolymer polyamide of the composition of the present invention comprises at least two distinct repeat units, these distinct units being formed from the two corresponding monomers or comonomers. Copolyamides are thus prepared from two or more monomers or comonomers chosen from an amino acid, a lactam, a dicarboxylic acid and a diamine.

The copolyamide according to the invention comprises at least two units (respectively represented "Z" and "XX.YY") and corresponds to (that is to say, comprises at least) the following general formula (2):

$$PA\ Z/XX.YY \qquad (2)$$

wherein Z represents a lactam L and/or an amino acid A, and XX represents a diamine and YY represents a dicarboxylic acid.

Diamines are aliphatic diamines linear or not, or cycloaliphatic diamines, or diamines with partially aromatic structures. Preferably the diamines are aliphatic branched or cycloaliphatic.

Diacids are aliphatic dicarboxylic acids, or aromatic dicarboxylic acids, or cycloaliphatic acids.

Preferably the copolyamide according to formula (2) in the composition of the of the invention, has molar content of Z is from 6 mol % to 82 mol %, the molar content of diamine XX being from 9 mol % to 47 mol % and the molar content of diacid YY also being from 9 mol % to 47 mol %. More preferably the molar content of Z is from 8 mol % to 40 mol %, the molar content of diamine XX being from 30 mol % to 46 mol % and the molar content of diacid YY also being from 30 mol % to 46 mol %.

The choice of such molar contents makes it possible to obtain, in the majority of cases, a copolyamide with a high light transmission.

The lactam L is chosen from γ-pyrrolidone (lactame 4), piperidinone (lactam 5), ε-caprolactam (lactam 6), enantholactam (lactam 7), caprylolactame (lactam 8), pelargolactam (lactam 9), decanolactam (lactam 10) undecanolactam (lactam 11) and laurolactam (lactam 12) and preferably from laurolactam.

The aminocarboxylic acid A is chosen among 9-aminononanoic acid, 10-aminodecanoic acid, 12-aminododecanoic acid and 11-aminoundecanoic acid and its derivatives, in particular N-heptyl-11-aminoundecanoic acid, and preferably from 12-aminododecanoic acid and 11-aminoundecanoic acid.

In place of one amino acid A or lactam L, it might also be possible to envisage a mixture of two, three or more amino acids and/or lactams. However, the copolyamides formed would then comprise three, four or more units respectively. It is specified that the specific case of such a copolyamide comprising three or more distinct units is described by the formula (2).

The XX diamine of formula (2) is chosen among the same diamine as the diamine given for formula (1).

The YY diacid of formula (2) is chosen among the same diacids as the diacids given for formula (1).

The molar proportions of XX diamine and of YY diacid of the formula (2) are preferably stoichiometric.

Among the combinations which can be envisaged for the copolyamide of general formula (2), the unit resulting from 11-aminoundecanoic acid being symbolized by the number 11, the unit resulting from laurolactam symbolized by the number 12, the unit resulting from terephthalic acid symbolized by the letter T, the following copolyamides are of particularly pronounced interest: 11/B.I, 11/B.T, 12/B.I, 12/B.T, 11/B.10, 12/B.10, 11/P.10, 12/P.10, 11/B.12, 12/B.12, 11/P.12, 12/P.12, 11/B.14, 12/B.14, 11/P.14, 12/P.14, 11/B.18, 12/B.18, 11/P.18, and 12/P.18.

Preferably the copolyamide of formula (2) is chosen from 11/B.I, 11/B.T, 12/B.I, 12/B.T, 11/B.10, 11/P.10, 11/B.12, 12/B.12, 11/P.12, 12/P.12 and 11/B.14, more preferably from 11/B.I, 12/B.I, 11/B.10, 11/P.10, 11/B.12, 12/B.12.

According to a third alternative form of the polyamide of the composition of the invention, the (co)monomer or unit Z in the general formula (2) of the copolyamide PA Z/XX.YY is a unit corresponding to the formula (3a):

VV.WW    (3a)

and the copolyamide correspond to formula (3b)

VV.WW/XX.YY    (3b)

wherein VV represents a diamine and WW represents a dicarboxylic acid.

Diamines are aliphatic diamines linear or not, or cycloaliphatic diamines, or diamines with partially aromatic structures.

Diacids are aliphatic dicarboxylic acids, or aromatic dicarboxylic acids, or cycloaliphatic acids.

Very clearly, the specific cases for which the XX.YY and VV.WW comonomers or units are strictly identical, are excluded in formulas (3a) and (3b), as this would be already the homopolyamide of formula (1).

The VV diamine can be a cycloaliphatic diamine. Reference will be made to that which was described above as cycloaliphatic diamine for the diamine of the XX.YY comonomer or unit.

The VV diamine can have a partially aromatic structure. Reference will be made to that which was described above as partially aromatic diamine for the diamine of the XX.YY comonomer or unit.

The VV diamine can be aliphatic and linear, and has the general formula $H_2N—(CH_2)_a—NH_2$. Preferably, the XX diamine is chosen among butanediamine (a=4), pentanediamine (a=5), hexanediamine (a=6), l'heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22), and diamines obtained from dimmer fatty diacids.

The VV diamine can be aliphatic and branched. Preferably, the VV diamine is chosen among 2-methyl-1,5-pentamethylenediamine, trimethyl-1,6-hexanediamine, 5-methylnonamethylenediamine, and their isomers or mixtures thereof.

The WW dicarboxylic acid could be aliphatic and linear, and has the general formula $HOOC—(CH_2)_b—COOH$. Preferably, it has from 4 to 36 carbon atoms. More preferably, it can be chosen among sebacic acid (b=8, 10 carbon atoms), dodecanedioic acid (b=10, 12 carbon atoms), tetradecanedioic acid (b=12, 14 carbon atoms), octadecanedioic acid (b=16, 18 carbon atoms), and dimer fatty diacids with b=34 (36 carbon atoms).

The WW dicarboxylic acid could be aromatic. Preferably, it is chosen among terephthalique acid, isophthalique acid, substituted aromatic dicarboxylic acid, for example 2,6-naphtalene dicarboxylic acid and 5-t-butylisophthalic acid.

The WW dicarboxylic acid could be cycloaliphatic, with at least one cyclohexane ring. Preferably, this cycloaliphatic diacid is 1,4-cyclohexanedicarboxylic acid, or 1,2-cyclohexanedicarboxylic acid.

For the preferred choice of the WW diacid of the VV.WW comonomer or unit in the formula (3a), reference will be made to that which was described above as preferred diacid for the YY diacid of the XX.YY comonomer or unit described in formula (2).

The molar proportions of VV diamine and of WW diacid of the formulas (3a) and (3b) are preferably stoichiometric.

Among the combinations which can be envisaged for the copolyamide of composition VV.WW/XX.YY, the WW diacid comprising w carbon atoms by the number w, the choice will in particular be made of the copolyamides corresponding to one of the formulae chosen from 6.10/B.I, 6.10/B.T, 10.10/B.I, 10.10/B.T, 6.12/B.I, 6.12/B.T, 10.12/B.I, 10.12/B.T, 6.10/P.I, 6.10/P.T, 10.10/P.I, 10.10/P.T, 6.12/P.I, 6.12/P.T, 10.12/P.I, 10.12/P.T, 6.10/B.10, 6.10/B.12, 6.10/B.14, 6.10/B.18, 10.10/B.10, 10.10/B.12, 10.10/B.14, 10.10/B.18, 10.12/B.10, 10.12/B.12, 10.12/B.14, 10.12/B.18, 6.10/P.10, 6.10/P.12, 6.10/P.14, 6.10/P.18, 10.10/P.10, 10.10/P.12, 10.10/P.14, 10.10/P.18, 10.12/P.10, 10.12/P.12, 10.12/P.14, 10.12/P.18, B.10/P.10, B.12/P.12, and B.14/P.14, more preferably B.12/P.12, B.10/P.10, B.14/P.14, 10.10/B.I, 10.12/B.I, 10.10/B.10, 10.10/P.10, 10.10/B.12, 10.10/P.12, 10.12/P.12, 10.12/B.12, 10.12/B.10, and 10.12/P.10 preferably 10.10/B.I, 10.10/B.T, 10.12/B.I, 10.12/B.T, 10.10/P.I, 10.10/P.T, 10.12/P.I, 10.12/P.T, 6.10/B.10, 10.10/B.10, 10.12/B.10, 6.10/P.10, 10.10/P.10, 10.12/P.10, 10.10/B.12, and 10.12/B.12, more preferably 10.10/B.I, 10.12/B.I, 10.10/B.10, 10.10/P.10, 10.10/B.12, 10.10/P.12, 10.12/P.12 and 10.12/B.12.

According to an additional aspect of the invention, the copolyamide described by the general formula (2) and/or formula (3) additionally comprises at least one third unit which is represented below as UU.TT in the formula (4):

Z/XX.YY/UU.TT    (4)

wherein UU represents a diamine and TT represents a dicarboxylic acid and Z represents a lactam L and/or an amino acid A.

The XX diamine of formula (4) is chosen among the same diamine as the diamine given for formula (1).

The YY diacid of formula (4) is chosen among the same diacids as the diacids given for formula (1).

The diamines UU of formula (4) are aliphatic diamines linear or not, or cycloaliphatic diamines, or diamines with partially aromatic structures. Preferably, diamines UU are aliphatic branched or cycloaliphatic.

The diacids TT are aliphatic dicarboxylic acids, or aromatic dicarboxylic acids, or cycloaliphatic acids. Preferably at least one of the diacid YY or TT in formula (4) is a aromatic dicarboxylic acid.

The lactam L and/or an amino acid A for the Z in formula (4) are the same as defined before.

Very clearly, the specific cases for which the XX.YY and UU.TT comonomers or units are strictly identical, are excluded.

In an advantageous version of the invention, the molar content of Z is from 10 mol % to 82 mol %, the molar content of diamine mixture XX+UU being from 9 mol % to 45 mol % and the molar content of diacid mixture YY+TT also being from 9 mol % to 45 mol %.

In preferred version of the invention, the molar content of Z is from 10 mol % to 46 mol %, the molar content of diamine XX being from 27 mol % to 45 mol % and the molar content of diacid YY also being from 27 mol % to 45 mol %.

The choice of such molar contents makes it possible to obtain, in the majority of cases, a copolyamide with a high light transmission.

The molar proportions of UU diamine and of TT diacid of the formula (4) are preferably stoichiometric.

In the present description of the formula (2) and (4), the term "at least" means that the copolyamide according to the invention comprises the formula which has been made explicit, respectively having 2 and having 3 units comprising the first 2 units, but this formula of 2 units or of 3 units can be included in a formula of a copolyamide additionally comprising yet other different units. A copolyamide according to the invention can thus exhibit 4, 5, or 6 etc. different units, provided that they comprise at least the 2 units Z/XX.YY or the 3 units Z/XX.YY/UU.TT.

Among the combinations which can be envisaged for the copolyamide of composition Z/XX.YY/UU.TT, the TT diacid comprising t carbon atoms by the number t, the choice will in particular be made of the copolyamides corresponding to one of the formula chosen from 12/B.I/B.T, 11/B.I/B.T, 12/P.I/P.T, 11/P.I/P.T, 12/B.10/B.I, 12/B.10/B.T, 11/B.10/B.I, 11/B.10/B.T, 12/B.12/B.I, 12/B.12/B.T, 11/B.12/B.I, 11/B.12/B.T, 12/P.10/P.I, 12/P.10/P.T, 11/P.10/P.I, 11/P.10/P.T, 12/P.12/P.I, 12/P.12/P.T, 11/P.12/P.I, 11/P.12/P.T, 11/B.10/B.14, 11/P.10/P.14, 11/B.12/B.14, 11/P.12/P.14, 12/B.10/B.14, 12/P.10/P.14, 12/B.12/B.14, 12/P.12/P.14, 11/B.10/B.12, 11/P.10/P.12, 12/B.10/B.12, 12/P.10/P.12, 11/P.12/B.12, 12/P.12/B.12, 11/P.10/B.10, and 12/P.10/B.10, preferably 12/B.I/B.T, 11/B.I/B.T, 12/P.I/P.T, 11/P.I/P.T, 12/B.10/B.I, 11/B.10/B.I, 12/B.10/B.T, 11/B.10/B.T, 11/B.10/B.12, 11/P.10/P.12, 12/B.10/B.12, 12/P.10/P.12, 12/P.10/P.T, 11/P.10/P.I, 12/P.10/P.I, and 11/P.10/P.T, more preferably 12/B.I/B.T, 11/B.I/B.T, 12/P.I/P.T, 11/P.I/P.T, 12/B.10/B.I, 11/B.10/B.I, 12/B.10/B.T, and 11/B.10/B.T.

In one preferred embodiment the transparent PA in accordance with the formula (1), or formula (2) and/or formula (3b), or formula (4) comprises not aromatic functions.

A composition of a transparent PA in accordance with the formula (1), or formula (2) and/or formula (3b), or formula (4), can additionally comprise at least one second polymer. Advantageously, this second polymer can be chosen from a semicrystalline polyamide, an amorphous polyamide, a semicrystalline copolyamide, an amorphous copolyamide, a polyetheramide, a polyesteramide and their blends.

The multistage polymer of the composition according to the invention has at least two stages that are different in its polymer composition. The multistage polymer comprises between 0 and 50 wt % of monomers comprising an aromatic group.

The multistage polymer is preferably in form of spherical polymer particles. These particles are also called core shell particles or core shell polymers. The first stage forms the core, the second or all following stages the respective shells.

With regard to the spherical polymer particle, it has a weight average particle size between 20 nm and 500 nm. Preferably the weight average particle size of the polymer is between 20 nm and 400 nm, more preferably between 20 nm and 350 nm and advantageously between 20 nm and 300 nm.

The polymer particle has a multilayer structure comprising at least one layer (A) comprising a polymer (A1) having a glass transition temperature below 0° C. and another layer (B) comprising a polymer (B1) having a glass transition temperature over 60° C. Preferably the polymer (B1) having a glass transition temperature over 60° C. is the external layer of the polymer particle having the multilayer structure.

The polymer particle according to the invention is obtained by a multistage process, such as two or three stages or more stages.

Preferably the polymer (A1) having a glass transition temperature below 0° C. in the layer (A) is made in the first stage of the multistage process forming the core for the polymer particle having the multilayer structure. Preferably the polymer (A1) is having a glass transition temperature below −5° C., more preferably below −15° C., advantageously below −25° C.

Preferably the polymer (B1) having a glass transition temperature over 60° C. is made in the last stage of the multistage process forming the external layer of the polymer particle having the multilayer structure.

There could be additional intermediate layer or layers obtained by an intermediate stage or intermediate stages.

The glass transition temperature Tg of the multistage polymer can be estimated for example by dynamic methods as thermo mechanical analysis.

The polymer (A1) and the layer (A) comprises from 0 wt % to less than 50 wt % of monomers with aromatic groups. The polymer (B1) and the layer (B) from 0 wt % to less than 50 wt % of monomers with aromatic groups.

In one embodiment the polymer (B1) and the layer (B) comprises no monomers with aromatic groups.

With regard to the polymer (A1) having a glass transition temperature below 0° C., it comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core mention may be made of isoprene homopolymers or butadiene homopolymers, isoprene-butadiene copolymers, copolymers of isoprene with at most 98 wt % of another vinyl monomer or monomers and copolymers of butadiene with at most 98 wt % of another vinyl monomer or monomers. The vinyl monomer may be styrene, an alkylstyrene, acrylonitrile, an alkyl (meth)acrylate, or butadiene or isoprene or mixtures thereof as long as the polymer (A1) comprises less than 50 wt % of monomers with aromatic groups.

The polymer (A1) can be crosslinked. Cross-linking monomers or agents useful in the present invention include, but are not limited to aromatic polyfunctional vinyl compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di and tri-allyl compounds such as diallyl phthalate, diallyl sebacate, and triallyltriazine.

In one embodiment the core made of polymer (A1) is a butadiene homopolymer.

In another embodiment the core made of polymer (A1) is a butadiene-styrene copolymer.

In one preferably embodiment the polymer (A1) comprises no styrene or other aromatic monomer latter excluding the crosslinking agents.

More preferably the glass transition temperature Tg of the polymer (A1) comprising at least 50 wt % of polymeric units coming from isoprene or butadiene is between −100° C. and 10° C., even more preferably between −80° C. and 0° C. and advantageously between −70° C. and −20° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 60° C.

The polymer (B1) can comprise functional monomers chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates and mixtures thereof.

The polymer (B1) can be crosslinked. Cross-linking monomers or agents useful in the present invention include, but are not limited to aromatic polyfunctional vinyl compounds such as divinylbenzene and divinyltoluene, polyhydric alcohols such as ethylene glycol dimethacrylate and 1,3-butanediol diacrylate, trimethacrylates, triacrylates, allyl carboxylates such as allyl acrylate and allyl methacrylate, and di and tri-allyl compounds such as diallyl phthalate, diallyl sebacate, and triallyltriazine.

Advantageously the polymer (B1) comprises at least 70 wt % of monomer units coming from methyl methacrylate.

In one preferred embodiment the polymer (B1) comprises no styrene or other aromatic monomer latter excluding the crosslinking agents.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinked.

The multi stage polymer in the composition according to the invention is obtained by a multistage process comprising at least two stages. Such a process is for example described in the documents US2009/0149600 or EP0722961.

Preferably the polymer (A1) having a glass transition temperature below 0° C. made during the stage (A), is the first stage of the multistage process.

Preferably the polymer (B1) having a glass transition temperature over 60° C. made during the stage (B) is made after the stage (A) of the multistage process.

More preferably the polymer (B1) having a glass transition temperature over 60° C. made during the stage (B) is the external layer of the polymer particle having the multilayer structure.

There could be additional intermediate stages between stage (A) and stage (B).

In order to obtain a sample of the respective polymers (A1) and (B1) they can be prepared alone, and not by a multistage process, for estimating and measuring more easily the glass transition temperature Tg individually of the respective polymers of the respective stages.

The weight ratio $r_b$ of the polymer (A1) of the layer comprised in stage (A) in relation to the complete multi stage polymer is at least 60 wt %, preferably at least 70 wt %, more preferably at least 75 wt %.

The weight ratio $r_b$ of the polymer (B1) of the external layer comprised in stage (B) in relation to the complete multi stage polymer is at least 5 wt %, preferably at least 6 wt %, more preferably at least 7 wt %.

According to the invention the ratio $r_b$ of the external stage (B) comprising polymer (B1) in relation to the complete multi stage polymer is at most 30 w %.

Preferably the ratio of polymer (B1) in view of the complete multi stage polymer is between 5 wt % and 30 wt %.

A further aspect of the present invention is the use of a multistage polymer as described above as an impact modifier for a transparent polyamide.

With regard to the polyamide polymer composition according to the invention, it comprises
a) a transparent polyamide and
b) a multistage polymer
characterized that the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10.

Preferably t is at most 7, more preferably at most 5, still more preferably at most 3 and advantageously at most 1.

The polyamide polymer composition according to the invention comprises between 1 wt % and 80 wt %, preferably between 2 wt % and 70 wt %, more preferably between 3 wt % and 50 wt %, advantageously between 3 wt % and 30 wt % and more advantageously between 3 wt % and 25 wt % of the multistage polymer.

The transparent polyamide is chosen in accordance with the formula (1), or formula (2) and/or formula (3b), or formula (4).

Preferably the polyamide polymer composition according to the invention comprises
a) a transparent polyamide and
b) a multistage polymer comprising one stage (A) comprising a polymer (A1) having a glass transition temperature of less than 0° C. and one stage (B) comprising a polymer (B1) having a glass transition temperature of at least 60° C. and characterized that the composition fulfills the following formula $$|k-l| \le t$$

wherein k represents the ratio in mol % of aromatic groups in the polyamide PA, l represents the ratio in mol % of aromatic groups in the multistage polymer and the parameter t is at most 10.

The transparent polyamide is chosen in accordance with the formula (1), or formula (2) and/or formula (3b), or formula (4).

The multistage polymer comprising one stage (A) comprising a polymer (A1) having a glass transition temperature of less than 0° C. and one stage (B) comprising a polymer (B1) having a glass transition temperature of at least 60° C. is obtained by a multistage process.

Preferably the polymer (A1) having a glass transition temperature below 0° C. made during the stage (A), is the first stage of the multistage process.

Preferably the polymer (B1) having a glass transition temperature over 60° C. made during the stage (B) is made after the stage (A) of the multistage process.

More preferably the polymer (B1) having a glass transition temperature over 60° C. made during the stage (B) is the external layer of the polymer particle having the multilayer structure.

The preferred and advantageously variants of the multistage polymer and the method for manufacturing the polymer obtained by the multistage process are the same as defined before.

The respective stages (A) and (B) comprising the polymers (A1) and (B1) respectively are the same as defined before.

The polyamide polymer composition according to the invention has a notched impact strength according to Charpy at 23° C. of at least 30 kJ/m², preferably at least 40 kJ/m² and more preferably at least 50 kJ/m².

The polyamide polymer composition according to the invention has a light transmission at 560 nm for a sheet of 2 mm thickness of at least 75%, preferably at least 80% and more preferably at least 88%.

The polyamide polymer composition according to the invention has a haze for a sheet of 2 mm thickness of at most 30%, preferably at most 20% and more preferably at most 10%.

Another aspect of the present invention is a method for manufacturing a polymer composition comprising the step of blending a transparent polyamide PA and a multistage polymer characterized that the composition fulfils the following formula $$|k-l| \le t$$

wherein k represents the ratio in mol % of aromatic groups in the polyamide PA, l represents the ratio in mol % of aromatic groups in the multistage polymer and the parameter t is at most 10.

The transparent polyamide is chosen in accordance with the formula (1), or formula (2) and/or formula (3b), or formula (4).

The polymer composition manufactured according to the method of the invention comprises between lwt % and 80 wt %, preferably between 2 wt % and 70 wt %, more preferably between 3 wt % and 50 wt %, advantageously between 3 wt % and 30 wt % and more advantageously between 3 wt % and 25 wt % of the multistage polymer obtained by the multistage process.

The polyamide polymer compositions according to the invention are not restricted. Rather all current additives for polyamide compositions can be added. Preferably, the additives are selected from the group consisting of inorganic and organic stabilisers, in particular antioxidants, antiozonants, light protection agents, UV stabilisers, UV absorbers or UV blockers, lubricants, colorants, marking agents, pigments, carbon black, graphite, titanium dioxide, zinc sulphide, zinc oxide, barium sulphate, carbon fibers, glass fibers, glass beads, carbon nanotubes, photochromic agents, antistatic agents, mould-release agents, optical brighteners, halogen-containing flame retardants, halogen-free flame retardants, natural layer silicates, synthetic layer silicates and mixtures thereof.

A further aspect of the present invention is the use of the polyamide polymer composition for producing transparent articles.

A still further aspect of the present invention is the use of the polyamide polymer composition for injection impact modified moulding compounds.

An additional aspect of the present invention is a transparent article with at least one region or one layer composed of a polyamide polymer composition as described above. This is particularly preferably a moulding, a foil, a profile, a tube, a hollow body, or an optically variable filter, or an optical lens, preferably an ophthalmic lens, particularly preferably an element with spectral filter effect, e. g. in the form of spectacle lens, sun lens, corrective lens, optical filter, inspection glasses, sport goggles or ski goggles, visor, safety spectacles, photo-recording, throughflow meters, bursting discs, display, optical data storage, housing or housing parts, especially for shaving apparatus, depilating appliances, measuring devices, or window in buildings or in vehicles, or is a decorative element or a structural element, e.g. in the form of a spectacle frame or spectacles earpieces, toy, or in the form of part of a sports shoe, or golf equipment especially a golf ball, or cover, in particular in the form of a mobile-telephone casing, a part of electronic equipment, memory media, infrared keys, transportable playback devices, personal digital assistants, smartphones, a coating, in particular of packaging, of decorative items, or of sports equipment, or cladding, preferably in the automobile sector.

The article can have a color, in particular a color gradient, an antireflective coating, a scratch-resistant coating, an optical-filter coating, a polarizing coating, an oxygen-barrier coating, or a combination of these coatings.

The present invention also provides a process for preparation of a polyamide polymer composition as described above. The process is in particular one which comprises mixing the homopolyamide and/or copolyamide in the form of pellets, and also the multistage polymer in the form of powder, granules, compacted powder or masterbatch and moulding them in an extruder with melt temperatures in the range from 220° C. to 350° C. to give an extrudate and chopping with suitable pelletizers to give pellets, preferably using a melt filter on the extruder to remove contamination from moulding compositions for transparent mouldings, suitable melt filters being those that can be constructed from sieves in sheet form or in the form of candle filters, with the possibility, during the compounding process, of adding additives which are desirable for modification of the moulding composition, e. g. processing stabilizers, color pigments, UV absorbers, heat stabilizers, flame retardants, other transparent polyamides.

The present invention also provides a process for preparation of a polyamide polymer composition as described above.

For the production of the polyamide moulding compound, the components are mixed on normal compounding machines, such as e.g. single- or twin-screw extruders or screw kneaders. The components are thereby metered individually into the feed or supplied in the form of a dry blend. The process is in particular one which comprises mixing the homopolyamide and/or copolyamide in the form of pellets, and also the multistage polymer in the form of powder, granules, compacted powder or masterbatch.

The additives can be used directly or in the form of a masterbatch. The carrier material of the masterbatch concerns preferably a polyolefin or a polyamide. Amongst the polyamides, there are suitable in particular PA 6, PA 12, PA11, or polyamide or copolyamide described in the present invention.

For the dry blend production, the dried granulates and/or possibly further additives are mixed together. This mixture is homogenised by means of a tumble mixer, drum hoop mixer or tumble drier for 10-40 minutes. In order to avoid absorption of moisture, this can be realized under dried protective gas.

The compounding is realized at set cylinder temperatures of 220° C. to 310° C. on a twin-screw extruder COPERION ZSK 26 MC. In front of the nozzle, a vacuum could be applied or degassing can take place at atmosphere. The melt is extruded, cooled and chopped with suitable pelletizers, preferably using a melt filter on the extruder to remove contamination from moulding compositions for transparent mouldings, suitable melt filters being those that can be constructed from sieves in sheet form or in the form of candle filters. The granulate is dried for 12-24 hours at 80 to 120° C. under nitrogen or in a vacuum to reach a water content of below 0.1 percent by weight.

The present invention further provides a process for production of an article as described above, which comprises moulding a polyamide moulding composition as described above in an extrusion process, in an injection blow-molding process, in an injection-molding process, or in an in-mold-coating process, to give the article.

[Methods]

The tests samples, from polyamide polymer composition described in the present invention, were produced on an injection moulding machine ENGEL VC 500/160 TECH. Cylinders temperatures of 270° C. to 300° C. were used. The mould temperature was 65° C. In the case of plates used for the measurement of the light transmission and of the haze, a polished mold was used.

Glass Transition Temperature of the Polyamide

The glass transition temperature Tg of polyamide were measured on pellets by using a TA Q2000 apparatus, according to the ISO 11357-2/2013 standard at a heating rate of 20 K/min.

Glass Transition Temperature of the Multistage Polymer

The glass transitions (Tg) of the multistage polymers is measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Tensile modulus of polyamide compositions were measured following the ISO 527-2/2012 standard on ISO test piece: ISO/CD 3167, type A1, 170×20/10×4 mm, at a temperature of 23° C.

Notch impact strength according to Charpy was measured following the ISO 179-2/1997/*eA standard, on ISO test piece: ISO/CD 3167, type B1, 80×10×4 mm, at a temperature of 23° C. and −30° C.

Light Transmission

Light transmissions were measured on a spectrophotocolorimeter Konica-Minolta CM-3610A, following the standard ASTM D 1003/1997, on plates 100×100 mm with a 2 mm thickness, with illuminant D65 at 560 nm. The light transmissions are indicated in % of the irradiated light quantity.

Haze

Haze values were measured on a spectrophotocolorimeter Konica-Minolta CM-3610A, following the standard ASTM D 1003/1997 with CIE standard illuminant Type C, on plates 100×100 mm with a 2 mm thickness. The haze values are indicated in % of the irradiated light quantity.

EXAMPLES

Raw Materials

PA1 is copolyamide PA 11/B.10 based on formula (2) with molar ratio 10/90 and having a Tg of 150° C. PA1 contains no aromatic unit.

PA2 is a copolyamide PA 12/B.I/B.T having a Tg of 170° C., based on formula (4) with molar ratio 35/20/45.

The multistage impact modifier (IM) can be synthesized according to US 2009/149600 or EP 0722961.

A first multistage impact modifier of the examples 1 and 2 is made according to the synthesis described in US 2009/149600. A multistage polymer is synthesized according to example 1 of US2009/149600 as first stage and example 6 as second stage, for obtaining a multistage polymer MBS1, comprising no styrene or aromatic monomer unit.

A second multistage impact modifier of the examples is made according to EP 0722961 for obtaining a multistage polymer MBS2, comprising about 33 wt % styrene or aromatic monomer unit.

Comparative example 1 is a non impact modified copolyamide PA1.

Example 1 is a compound comprising 5 wt % of MBS1 in PA1.

Example 2 is a compound comprising 10 wt % of MBS1 in PA1.

Example 3 is a compound comprising 15 wt % of MBS1 in PA1.

Comparative example 2 is a non impact modified copolyamide PA2.

Example 4 is a compound comprising 5 wt % of MBS2 in PA2.

Example 5 is a compound comprising 10 wt % of MBS2 in PA2.

Example 6 is a compound comprising 15 wt % of MBS2 in PA2.

TABLE 1

Characteristics of composition with polyamide PA1 and MBS1

| | Comparative example 1 PA1 | Example 1 PA1 | Example 2 PA1 | Example 3 PA1 |
|---|---|---|---|---|
| Wt % of multistage polymer MBS1 in composition | 0 | 5 | 10 | 15 |
| Impact resistance at 23° C./[kJ/m2] | 10 | 25 | 35 | 54 |
| Impact resistance at −30° C./[kJ/m2] | 8 | 13 | 21 | 44 |
| Tensile Modulus [MPa] | 1690 | 1630 | 1518 | 1421 |
| Haze [%] | | 4.6 | 8.9 | 13.6 |
| Light Transmission [%] | 90.5 | 88.9 | 87.3 | 86.2 |

The impact resistance of examples 1, 2 and 3 according to the invention is increased considerably, while the decrease of the modulus, light transmission and haze is acceptable.

TABLE 2

Characteristics of composition composition with polyamide PA2 and MBS2

| | Comparative example 2 PA2 | Example 4 PA2 | Example 5 PA2 | Example 6 PA2 |
|---|---|---|---|---|
| Wt % of multistage polymer MBS2 in composition | 0 | 5 | 10 | 15 |
| Impact resistance at 23° C./[kJ/m2] | 15 | 32 | 43 | 37 |
| Impact resistance at - −30° C./[kJ/m2] | 15 | 20 | 21 | 19 |
| Tensile Modulus [MPa] | 2100 | 1930 | 1901 | 1697 |
| Haze [%] | 0.6 | 4.7 | 11.9 | 15.6 |
| Light Transmission [%] | 90.9 | 88.9 | 87.7 | 87.0 |

The impact resistance of examples 4, 5 and 6 according to the invention is increased considerably, while the decrease of the modulus, light transmission and haze is acceptable.

The invention claimed is:

1. A polyamide polymer composition comprising
a) a transparent polyamide PA having light transmission of a sheet of 2 mm thickness that is at least 75% measured at 560 nm (ISO 13468-1/1996), and
b) a multistage polymer, in the form of core shell particles having a core, at least one shell, and a weight average particle size between 20 nm and 500 nm, where the first stage forms the core, the second or all following stages form respective shells, said multistage polymer comprising said first stage (A) comprising polymer (A1) having a glass transition temperature of less than 0° C., and said second stage (B) comprising polymer (B1) having a glass transition temperature of at least 60° C. or higher, wherein a weight ratio $r_b$ of polymer (A1) in stage (A) in relation to the complete multistage polymer is at least 60 wt %,
and wherein the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10, and wherein |k−l| is an absolute value of the result of k−l.

2. The polymer composition according to claim 1 wherein the parameter t is at most 1.

3. The polymer composition according to claim 1 wherein the polyamide PA has melting enthalpy of less than 7 J/g.

4. The polymer composition according to claim 1 wherein the polyamide PA has melting enthalpy of at most 3 J/g.

5. The polymer composition according to claim 1 wherein the polyamide PA is represented either by formula (1):

$$PA\ XX.YY \tag{1}$$

wherein XX presents a diamine and YY present a diacid
or by formula (2):

$$PA\ Z/XX.YY \tag{2}$$

wherein Z represents a lactam L and/or an amino acid A, and XX represents a diamine and YY represents a dicarboxylic acid
or by formula (3b)

$$PA\ VV.WW/XX.YY \tag{3b}$$

wherein VV and XX represents a diamine and WW and YY represents a dicarboxylic acid
or by formula (4)

$$PA\ Z/XX.YY/UU.TT \tag{4}$$

wherein Z represents a lactam L and/or an amino acid A, XX and UU represents a diamine and YY and TT represents a dicarboxylic acid, the specific cases for which the XX, YY, and UU, TT comonomers or units are strictly identical, being excluded.

6. The polymer composition according to claim 5 wherein the lactam L is chosen from the group consisting of γ-pyrrolidone, piperidinone, ε-caprolactam, enantholactam, caprylolactame, pelargolactam, decanolactam, undecanolactam and laurolactam.

7. The polymer composition according to claim 5 wherein the diamine XX, VV and UU is chosen from the group consisting of aliphatic diamines linear or not, cycloaliphatic diamines, and diamines with partially aromatic structures.

8. The polymer composition according to claim 5 wherein the diacid is chosen from the group consisting of dicarboxylic acids.

9. The polymer composition according to claim 5 wherein the polyamide PA represented by formula (1) is chosen from the group consisting of TMD.T, TMD.I, TMD.18, TMD.14, TMD.12, TMD.10, MPMD.T, MPMD.I, MPMD.18, MPMD.14, MPMD.12, MPDM.10, B.10, B.11, B.12, B.13, B.14, B.16, B.18, B.19, B.20, B.21, B.I, P.10, P.11, P.12, P.13, P.14, P.16, P.18, P.19, P.20, P.I, and P.21.

10. The polymer composition according to claim 5 wherein the polyamide PA represented by formula (2) is chosen from the group consisting of 11/B.I, 11/B.T, 12/B.I, 12/B.T, 11/B.10, 12/B.10, 11/P.10, 12/P.10, 11/B.12, 12/B.12, 11/P.12, 12/P.12, 11/B.14, 12/B.14, 11/P.14, 12/P.14, 11/B.18, 12/B.18, 11/P.18, and 12/P.18, where B is bis(3-methyl-4-aminocyclohexyl)methane (BMACM), P is p-bis(aminocyclohexyl)methane (PACM), and I is isophthalic acid.

11. The polymer composition according to claim 5 wherein the polyamide PA represented by formula (3b) is chosen from the group consisting of 6.10/B.I, 6.10/B.T, 10.10/B.I, 10.10/B.T, 6.12/B.I, 6.12/B.T, 10.12/B.I, 10.12/B.T, 6.10/P.I, 6.10/P.T, 10.10/P.I, 10.10/P.T, 6.12/P.I, 6.12/P.T, 10.12/P.I, 10.12/P.T, 6.10/B.10, 6.10/B.12, 6.10/B.14, 6.10/B.18, 10.10/B.10, 10.10/B.12, 10.10/B.14, 10.10/B.18, 10.12/B.10, 10.12/B.12, 10.12/B.14, 10.12/B.18, 6.10/P.10, 6.10/P.12, 6.10/P.14, 6.10/P.18, 10.10/P.10, 10.10/P.12, 10.10/P.14, 10.10/P.18, 10.12/P.10, 10.12/P.12, 10.12/P.14, 10.12/P.18, B.10/P.10, B.12/P.12, and B.14/P.14.

12. The polymer composition according to claim 5 wherein the polyamide PA represented by formula (4) is chosen from the group consisting of 12/B.I/B.T, 11/B.I/B.T, 12/P.I/P.T, 11/P.I/P.T, 12/B0.10/B.I, 12/B0.10/B.T, 11/B0.10/B.I, 11/B0.10/B.T, 12/B0.12/B.I, 12/B0.12/B.T, 11/B0.12/B.I, 11/B0.12/B.T, 12/P.10/P.I, 12/P.10/P.T, 11/P.10/P.I, 11/P.10/P.T, 12/P.12/P.I, 12/P.12/P.T, 11/P.12/P.I, 11/P.12/P.T, 11/B.10/B.14, 11/P.10/P.14, 11/B.12/B.14, 11/P.12/P.14, 12/B.10/B.14, 12/P.10/P.14, 12/B.12/B.14, 12/P.12/P.14, 11/B.10/B.12, 11/P.10/P.12, 12/B.10/B.12, 12/P.10/P.12, 11/P.12/B.12, 12/P.12/B.12, 11/P.10/B.10, and 12/P.10/B.10.

13. The polymer composition according to claim 1 wherein the polyamide PA is represented by formula (1):

PA XX.YY (1)

wherein XX presents a diamine and YY present a diacid.

14. The polymer composition according to claim 1 wherein the polyamide PA is represented by formula (2):

PA Z/XX.YY (2)

wherein Z represents a lactam L and/or an amino acid A, and XX represents a diamine and YY represents a dicarboxylic acid.

15. The polymer composition according to claim 14 wherein Z is an aminocarboxylic acid A chosen from the group consisting of 9-aminononanoic acid, 10-aminodecanoic acid, 12-aminododecanoic acid, 11-aminoundecanoic acid, and derivatives thereof.

16. The polymer composition according to claim 1 wherein the polyamide PA is represented by formula (3b)

PA VV.WW/XX.YY (3b)

wherein VV and XX represents a diamine and WW and YY represents a dicarboxylic acid.

17. The polymer composition according to claim 1 wherein the polyamide PA is represented by formula (4)

PA Z/XX.YY/UU.TT (4)

wherein Z represents a lactam L and/or an amino acid A, XX and UU represents a diamine and YY and TT represents a dicarboxylic acid.

18. The polymer composition according to claim 1 wherein the transparent PA comprises no aromatic functions.

19. The polymer composition according to claim 1 wherein the composition further comprises at least one polymer from the group consisting of semicrystalline polyamide, amorphous polyamide, semicrystalline copolyamide, amorphous copolyamide, polyetheramide, polyesteramide and their blends.

20. The polymer composition according to claim 1 wherein polymer (B1) has a glass transition temperature over 60° C. and forms an external shell layer of a core shell polymer particle.

21. The polymer composition according to claim 1 wherein the polymer (A1) comprises at least 50 wt % of polymeric units coming from isoprene or butadiene.

22. The polymer composition according to claim 1 wherein the polymer (B1) is a (meth) acrylic polymer.

23. The polymer composition according to claim 1 wherein the polymer (B1) comprises at least 70 wt % monomers chosen from the group consisting of C1 to C12 alkyl (meth)acrylates.

24. The polymer composition according to claim 1 wherein the glass transition temperature Tg of the polymer (B1) is between 60° C. and 150° C.

25. The polymer composition according to claim 1 wherein polymer (A1) is a butadiene homopolymer.

26. The polymer composition according to claim 1 wherein polymer (A1) is a butadiene-styrene copolymer.

27. The polymer composition according to claim 1 wherein polymer (B1) comprises no styrene or other aromatic monomer.

28. An article comprising a composition according to claim 1 in at least one region or one layer.

29. The article according to claim 28, wherein the article is selected from the group consisting of a moulding, a foil, a profile, a tube, a hollow body, an optically variable filter, an optical lens, spectacle lens, sun lens, corrective lens, optical filter, inspection glasses, sport goggles, ski goggles, visor, safety spectacles, through-flow meters, bursting discs, optical data storage, measuring devices, window, a decorative element, a structural element, sports shoe, golf ball, a mobile telephone casing, a part of electronic equipment, memory media, infrared keys, transportable playback devices, personal digital assistants, smartphones, and a coating.

30. A process for manufacturing a transparent polyamide polymer composition comprising the step of blending a transparent polyamide PA having light transmission of a sheet of 2 mm thickness that is at least 75% measured at 560 nm (ISO 13468-1/1996, and a multistage polymer in the form of core shell particles having a core, at least one shell, and a weight average particle size between 20 nm and 500 nm, where the first stage forms the core, the second or all following stages form respective shells, said multistage polymer comprising said first stage (A) comprising polymer (A1) having a glass transition temperature of less than 0° C., and said second stage (B) comprising polymer (B1) having a glass transition temperature of at least 60° C. or higher, wherein a weight ratio $r_b$ of polymer (A1) in stage (A) in relation to the complete multistage polymer is at least 60 wt %, and wherein the composition fulfills the following formula $$|k-l| \leq t$$

wherein k represents the ratio in mol % of aromatic groups in the polyamide PA, l represents the ratio in mol % of aromatic groups in the multistage polymer and the parameter t is at most 10, and wherein $|k-l|$ is an absolute value of the result of k−l.

31. The process according to claim 30 wherein the parameter t is at most 1.

* * * * *